(No Model.)
J. MILLER.
MACHINE FOR DAMPENING OR WETTING GRAIN.
No. 278,996. Patented June 5, 1883.
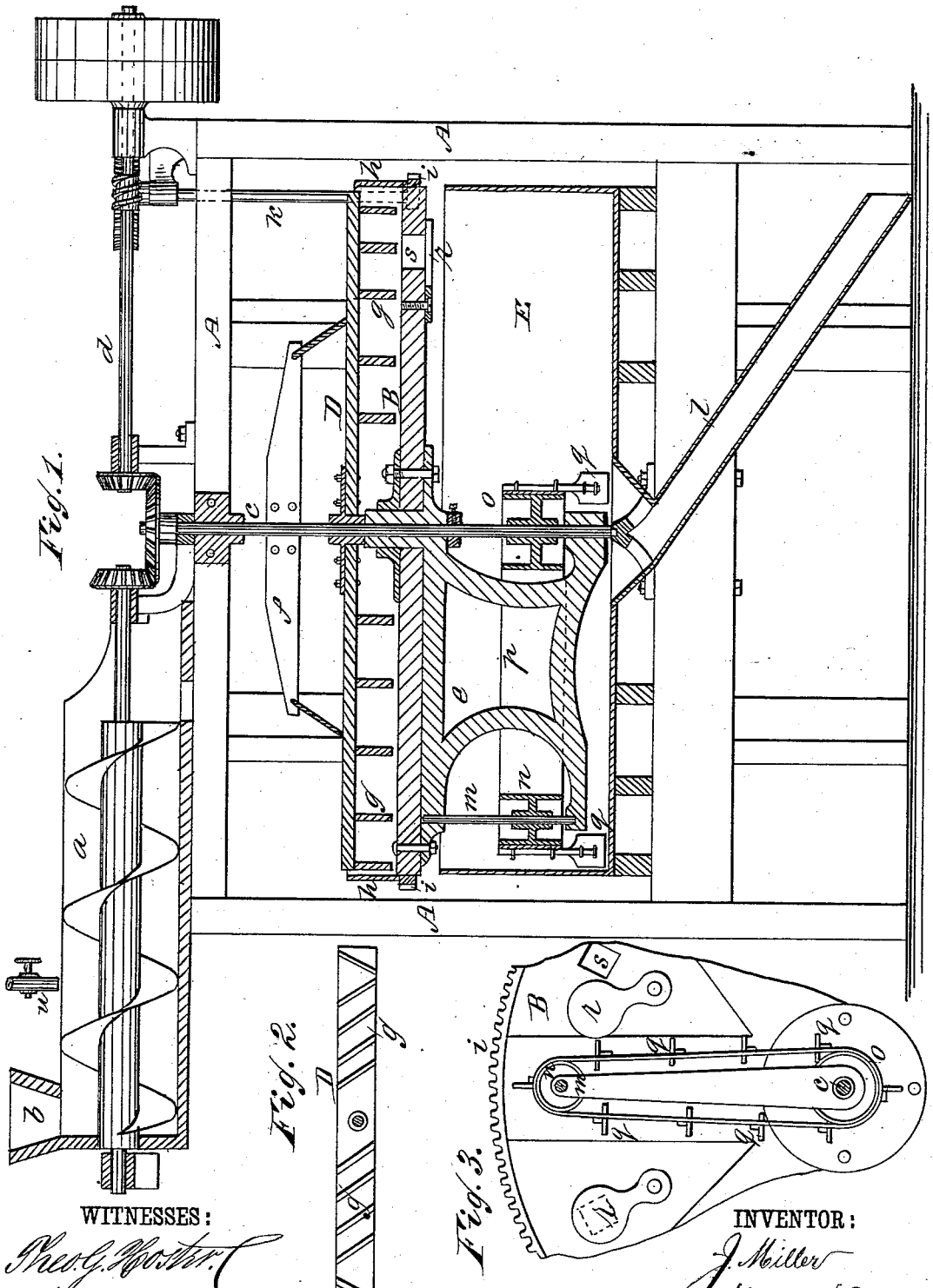
WITNESSES:
INVENTOR:
J. Miller
BY Munn & Co.
ATTORNEYS.

United States Patent Office.

JOHN MILLER, OF MILTON, OREGON.

MACHINE FOR DAMPENING OR WETTING GRAIN.

SPECIFICATION forming part of Letters Patent No. 278,996, dated June 5, 1883.

Application filed December 12, 1882. (No model.)

*To all whom it may concern:*

Be it known that I, JOHN MILLER, of Milton, in the county of Umatilla, in the State of Oregon, have invented a new and Improved Machine for Dampening or Wetting Grain, of which the following is a full, clear, and exact description.

My improvements relate to machines for dampening or wetting wheat previous to grinding, the object of the wetting being to toughen the outer coating of the grain, so as to prevent its pulverization during the grinding process.

The object of my invention is to construct an apparatus in which the wetting operation can be accurately regulated, and the supply of the dampened grain to the grinding-mill regulated according to the capacity of the mill, so that there shall be no accumulation of the wetted grain beyond what is necessary to secure the proper moistening of the hulls.

To these ends my invention consists in the apparatus hereinafter described and claimed.

Reference is to be had to the accompanying drawings, forming a part of this specification, in which similar letters of reference indicate corresponding parts in all the figures.

Figure 1 is a sectional elevation of my improved machine. Fig. 2 is a face view of the rake. Fig. 3 is a partial plan view, inverted, of the revolving table.

A is the supporting-frame of the machine, fitted at its upper side with a horizontal conveyer, $a$, and hopper $b$.

$c$ is a vertical shaft, fitted in suitable bearings at the middle of the frame, and connecting at its upper end by beveled gearing with the main drive-shaft $d$, and also with the shaft of the conveyer $a$.

B is a circular table, supported by a collar on shaft $c$ and carrying a frame, $e$, which is hung on the vertical shaft $c$.

D is a rake fitted loosely on the shaft $c$ above the table, and supported at its outer end by connections to a cross-head, $f$, which is fixed on the shaft $c$ and serves to rotate the rake. The rake, as shown most clearly in Fig. 2, consists of a flat bar, to the under side of which are attached wings or teeth $g\ g$, that are inclined in the direction for moving the grain upon the table out toward the rim of the table.

The table B is provided with a rim or curb, $h$, and is fitted at its outer edge with a cogged rim, $i$, that is engaged by a pinion on a vertical shaft, $k$, and is rotated by a worm and worm-wheel on the driving-shaft $d$, so as to cause the slow rotation of the table B.

In the table B, near its outer edge, are openings $s$, which are fitted with slides or covers $r$.

Beneath the table B is a hopper, E, which is of a size for containing a considerable quantity of grain, and at the center of the hopper E is a discharge-spout, $l$, for carrying the grain to the hopper of the grinding-mill. The supporting-frame $e$ of the table is within the hopper E, and at the outer end of this frame is a vertical shaft, $m$, carrying a pulley, $n$, and on the center shaft, $c$, is a similar pulley, $o$. Around the two pulleys passes a belt, $p$, which carries scrapers $q$.

In the operation of this machine the wheat is supplied to the hopper $b$ and is carried forward by the conveyer, and while in the conveyer the wheat will be wetted by water supplied through a suitable pipe, $u$, and in suitable quantity. From the conveyer the wheat drops on the table B, and the rake D, being in motion, acts to carry the wheat from the center of the table toward the outside and to the discharge-openings $s$. From the openings $s$ the wheat falls into the hopper E. The belt $p$ and the scrapers $q$ are carried around over the bottom of the hopper E by the movement of the table B, and at the same time, the belt being moved by the pulley on the shaft $c$, the scrapers $q$ act to carry the grain from the outer portion of the hopper E toward the center and to the opening leading to the discharge-port $l$. By regulating the speed of the drive-shaft, the table and rake will be revolved faster or slower, and the covers $r$ of the openings $s$ being turned to cover more or less of the openings, according to the speed of the said table and rake, the grain is made to pass through the machine more or less rapidly, according to the time that is required to insure a thorough saturation of the hulls. In this manner the grain can be properly prepared for grinding, and, being immediately supplied to the grinding-mill as soon as prepared, the hulls will come off in large pieces and so clean as not to need regrinding, and a larger and better yield of flour is obtained. At the same time the outer coating or hulls of the grain only being wetted, while the flour portions remain dry, the flour can be more readily bolted, and it is not liable to become spoiled by being dampened in the operation of wetting the grain. No large supply of wetted grain is necessary to be kept on hand, as the wetting process is carried on at the same time as the grinding, and only so fast as is required to supply the grinding-mill.

Having thus described my invention, I claim as new and desire to secure by Letters Patent—

1. In machines for wetting grain, the combination of the table B and hopper E, both having discharge-openings, the revolving rake D, the shaft $c$, the belt $p$, and scrapers $q$, substantially as shown and described, for operation as specified.

2. In machines for wetting grain, the combination, with the revolving table B, having discharge-openings $s$, of the revolving rake D, provided with the inclined teeth or wings $g$, substantially as shown and described.

3. In machines for wetting wheat, the combination, with the table B and receiving-hopper E, both having discharge-openings, of the central shaft, $c$, the frame $e$, the pulleys $n$ $o$, the belt $p$, and scrapers $q$, substantially as described, for operation as set forth.

4. The combination, with the receiving-hopper E, having discharge-port $l$, and the central shaft, $c$, of the shaft $m$, pulleys $n$ $o$, the belt $p$, and scrapers $q$, substantially as described, for operation as set forth.

5. The combination, with the revolving rake D, and table B, provided with the cogged rim $i$, of the shaft $k$, carrying a pinion engaging the cogged rim $i$, and suitable connections for giving rotation to the shaft, substantially as shown and described.

6. The combination, with the hopper E, of the revolving table B, having discharge-openings $s$, and the revolving rake D, substantially as shown and described.

JOHN MILLER.

Witnesses:
JNO. B. WILLIAMSON,
JOHN B. WEBB.